United States Patent [19]
Ohtsuchi

[11] Patent Number: 6,002,564
[45] Date of Patent: Dec. 14, 1999

[54] OVERCURRENT PROTECTION THICK-FILM RESISTOR DEVICE AND OVERCURRENT PROTECTION CIRCUIT USING THE SAME

[75] Inventor: Masashi Ohtsuchi, Komatsu, Japan

[73] Assignee: Murata Manufacturing Co., Ltd., Kyoto-fu, Japan

[21] Appl. No.: 08/982,429

[22] Filed: Dec. 2, 1997

[30] Foreign Application Priority Data

Dec. 11, 1996 [JP] Japan .................................. 8-330826
Oct. 8, 1997 [JP] Japan .................................. 9-275813

[51] Int. Cl.$^6$ ..................................................... H02H 3/00
[52] U.S. Cl. .............................. 361/93; 361/58; 361/118; 361/103
[58] Field of Search ................................. 361/93, 58, 118, 361/119, 127, 103, 104, 105, 106, 115

[56] References Cited

U.S. PATENT DOCUMENTS 4,284,970 8/1981 Berrin ........................................ 338/195

Primary Examiner—Jeffrey Gaffin
Assistant Examiner—Stephen Jackson
Attorney, Agent, or Firm—Burns, Doane, Swecker & Mathis, L.L.P.

[57] ABSTRACT

An overcurrent protection thick-film resistor device and overcurrent protection circuit employing the same are provided. Overcurrent (e.g., surge current) flows into the overcurrent protection circuit due to electrical shorting between external cables and power lines in communication networks. The thick-film resistor suppresses sparks due to such overcurrent, which would otherwise negatively affect peripheral parts or components disposed around the overcurrent protection circuit. This function is achieved by providing a thick-film resistor having an elongated meander or spiral shape, and also having a width-reduced section at one location of the thick-film resistor. Any sparks will predictably occur at this width-reduced section. A casing or other spark-dampening mechanism can be disposed selectively around the width-reduced section of the thick-film resistor.

16 Claims, 6 Drawing Sheets

OVERCURRENT PROTECTION THICK-FILM RESISTOR DEVICE AND OVERCURRENT PROTECTION CIRCUIT USING THE SAME

BACKGROUND OF THE INVENTION

This application corresponds to Japanese Patent Application Nos. 8-330826 and 9-275813, filed on Dec. 11, 1996 and Oct. 8, 1997, respectively, both of which are hereby incorporated by reference in their entirety.

1. Field of the Invention

The present invention relates generally to overcurrent protection architecture and, more particularly, to thick-film resistor devices in communication networks and overcurrent protection circuitry employing the same. The invention also relates to overcurrent protection thick-film resistor devices and overcurrent protection circuitry employing the same, which devices are installed at interface sections between external cables of remote stations for implementing communication equipment and interstation communication equipment for use in protecting the station communication equipment against excess or overcurrent occurring due to application of surge voltages resulting from electrical storms (e.g., lightning) and/or accidental electrical contacts formed between external cables and power lines.

2. Description of the Prior Art

FIG. 5 shows one typical configuration of a prior known overcurrent protection circuit. In FIG. 5, the overcurrent protection circuit 10 is provided between two external cables 17, 18 and associated equipment to be protected (referred to as "to-be-protected" communication equipment) 19. The overcurrent protection circuit 10 comprises overcurrent protection thick-film resistor devices 11, 14, positive characteristic thermistors 12, 15 and variable resistors or "varistors" 13, 16. The overcurrent protection thick-film resistor devices 11, 14 and positive thermistors 12, 15 are respectively connected in series between external cables 17, 18 and the to-be-protected equipment 19. Interconnection nodes between the positive thermistors 12, 15 and the to-be-protected equipment 19 are coupled to ground via varistors 13, 16 respectively.

The configuration of a prior art overcurrent protection thick-film resistor device 11 is shown in FIG. 6. In FIG. 6, the overcurrent protection thick-film resistor device 11 includes an insulating or dielectric substrate 1 having a surface on which a thick-film resistor 2 is formed having a meander shape. An input terminal 3 and output terminal 4 are provided at ends of the thick-film resistor 2. Note here that since the overcurrent protection thick-film resistor device 14 has the same configuration as the overcurrent protection thick-film resistor device 11, an explanation thereof will be omitted herein.

The operation of the overcurrent protection thick-film resistor device 10 will now be explained with reference to FIGS. 5 and 6. In the overcurrent protection thick-film resistor device 10 of FIG. 5, upon application of a surge voltage (in which the potential is approximately 1 kV and the duration of the surge is less than or equal to about 1 ms) from the communication cables 17, 18 due to lightning or the like, resultant current can flow through the overcurrent protection thick-film resistor devices 11, 14 and positive thermistors 12, 15 and then to ground through varistors 13, 16, thereby ensuring that any surge voltage is not applied to the to-be-protected equipment 19. Since the overcurrent protection thick-film resistor devices 11, 14 are formed having an elongated meander-like shape, any disconnection or open-circuiting due to sparks will no longer take place. More specifically, by using an elongated meander-like resistor, a voltage applied to each unit length of the elongated resistor can be reduced. For instance, the voltage can be about ⅕ of a voltage applied to each unit length of a conventional square resistor. For this reason, as the length of the meander-like resistor is increased, the resistor provides better characteristics toward surge.

On the other hand, when the external cables 17, 18 are bought into contact (short) with an associated power line (e.g., an AC 600 V line or the like), excessive or overcurrent can be supplied from external cables 17, 18 to overcurrent protection circuit 10. In response to such overcurrent, the positive thermistors 12, 15 of overcurrent protection circuit 10 generate heat, increasing their electrical resistance, which thereby interrupts or cuts off the flow of such overcurrent. However, it may require some time before the positive thermistors 12, 15 reach their high resistance state caused by the generation of heat. This time lag may result in a risk that the overcurrent can flow into the to-be-protected equipment during such period. To mitigate this problem, the prior art circuit 10 is configured such that sparks occur at several portions of the meander-like thick-film resistor 2 in overcurrent protection thick-film resistor devices 11, 14, leading to a disconnection or open-circuit, thus eliminating application of overcurrent to the to-be-protected equipment.

However, in the above-described prior art, the exact location at which the sparks occur upon application of overcurrent to the overcurrent protection thick-film resistor device can not be predicted. Spark discharge or arc due to sparking of the overcurrent protection thick-film resistor device creates a high risk of negatively affecting associated parts or components disposed near or around the overcurrent protection thick-film resistor device. For example, these sparks can lead to electrical shorting, lead disconnection or the like in such associated parts or components. To prevent these problems, it is necessary that a constant distance be maintained between the site of the spark and such other components. Alternatively, certain techniques can be employed for forcing the interruption of spark discharge. Unfortunately, even in such cases, since the exact spark locations can not be specified or predetermined in advance, it is required that the other components be separated by a prescribed distance from the entire structure of the overcurrent protection thick-film resistor device. Alternatively, it is required that a casing or the like be provided as a coating means for completely coating or "wrapping" the meander-like resistor (e.g., the coating entirely envelopes the thick-film resistor device). However, this coating increases the size of the thick-film resistor device component, which reduces the spatial efficiency of the device. This coating may also increase the cost of this device.

SUMMARY OF THE INVENTION

It is therefore an object of the present invention to provide an overcurrent protection thick-film resistor device capable of avoiding the above-discussed problems encountered in the prior art.

It is another object of the invention to provide an overcurrent protection thick-film resistor device capable of rendering the spark generating locations predictable and also capable of protecting electrical components disposed nearby the resistor against spark discharge or arc due to occurrence of sparks at low costs.

It is a further object of the invention to provide overcurrent protector circuitry employing therein a thick-film resistor device capable of rendering the spark generating locations predictable and also capable of protecting electrical components disposed nearby against spark discharge or arc due to occurrence of sparks at low costs.

To attain the foregoing objects, the instant invention provides a thick-film resistor device for overcurrent protection having an insulating substrate with at least a thick-film resistor of a meander shape or spiral shape formed thereon. The thick-film resistor includes a width-reduced section provided at a single location of the thick-film resistor.

Another feature of the overcurrent protection thick-film resistor device in accordance with the invention is that the width-reduced section in the thick-film resistor is covered by a coating means.

Another aspect of the present invention pertains to an overcurrent protection circuit which employs the above-described overcurrent protection thick-film resistor device.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION OF THE INVENTION

Figure 1:
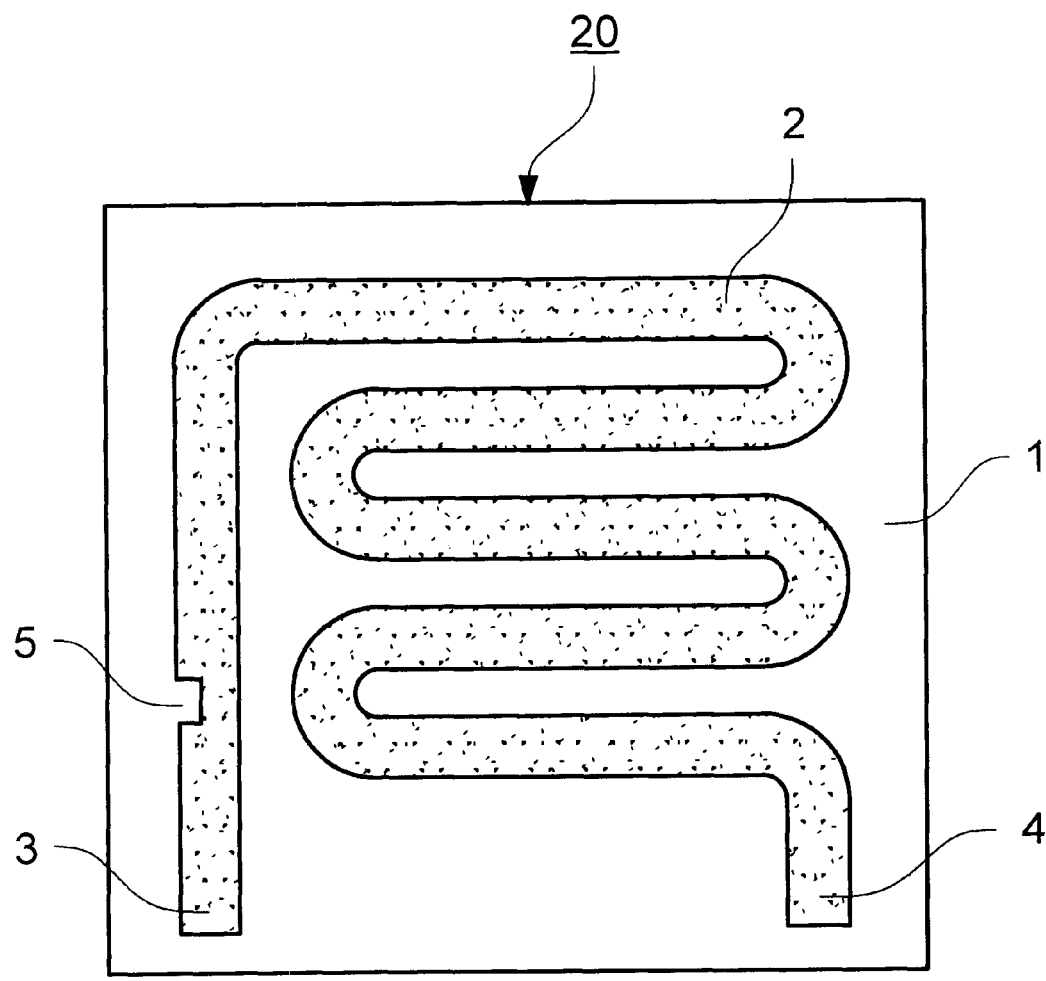
FIG. 1 shows a planar structure of an overcurrent protection thick-film resistor device in accordance with one exemplary embodiment of the present invention.
Figure 4:
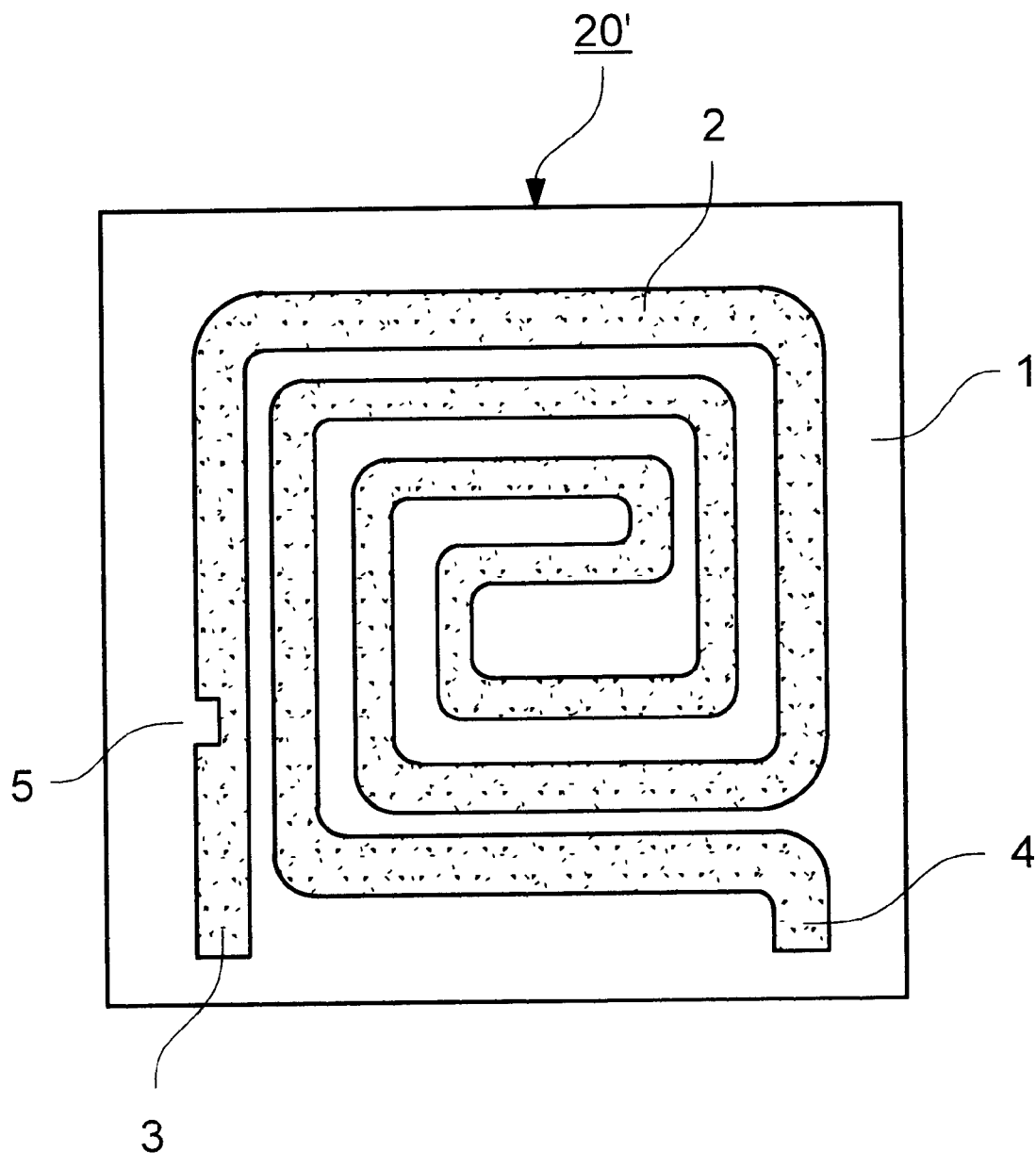
FIG. 4 shows a planar structure of an overcurrent protection thick-film resistor device in accordance with another exemplary embodiment of the invention.

Referring to FIG. 1, a thick-film resistor device for overcurrent protection in accordance with one preferred embodiment of the present invention is generally designated by reference numeral 20. In FIG. 1, certain parts or elements similar to those of the prior art are designated by similar reference numerals or symbols, and an explanation thereof will be omitted herein. In FIG. 1, a width-reduced section 5 is provided at one selected location of a thick-film resistor 2 of an overcurrent protection thick-film resistor device 20. The resistor 2 has a meander-like shape. Alternatively, a spiral shape can be used, as in the case of thick-film resistor device 20' shown in FIG. 4.

Figure 2:
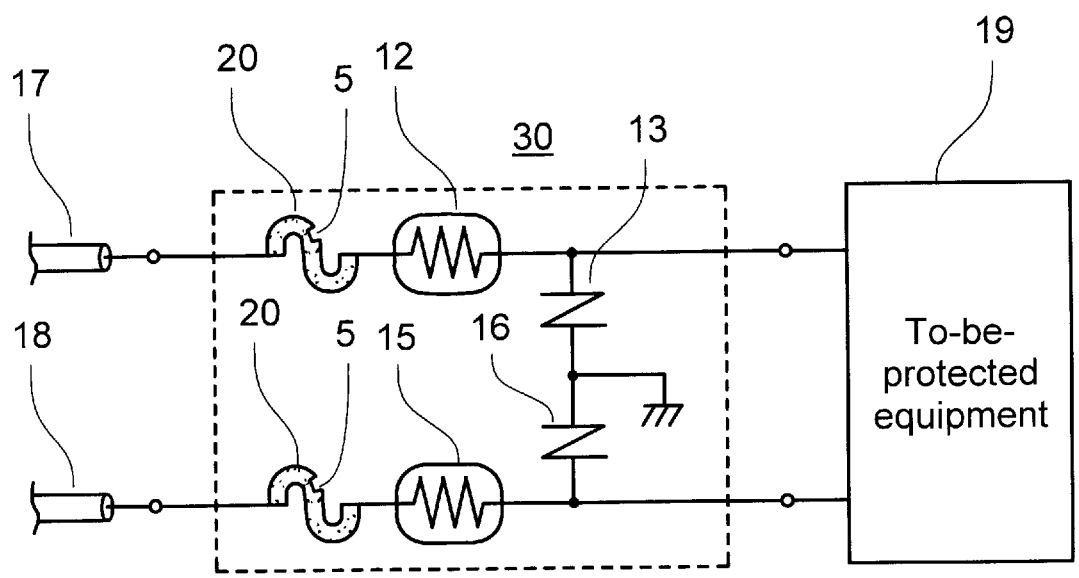
FIG. 2 shows a configuration of an overcurrent protection circuit employing the resistor device of FIG. 1.
Figure 5:
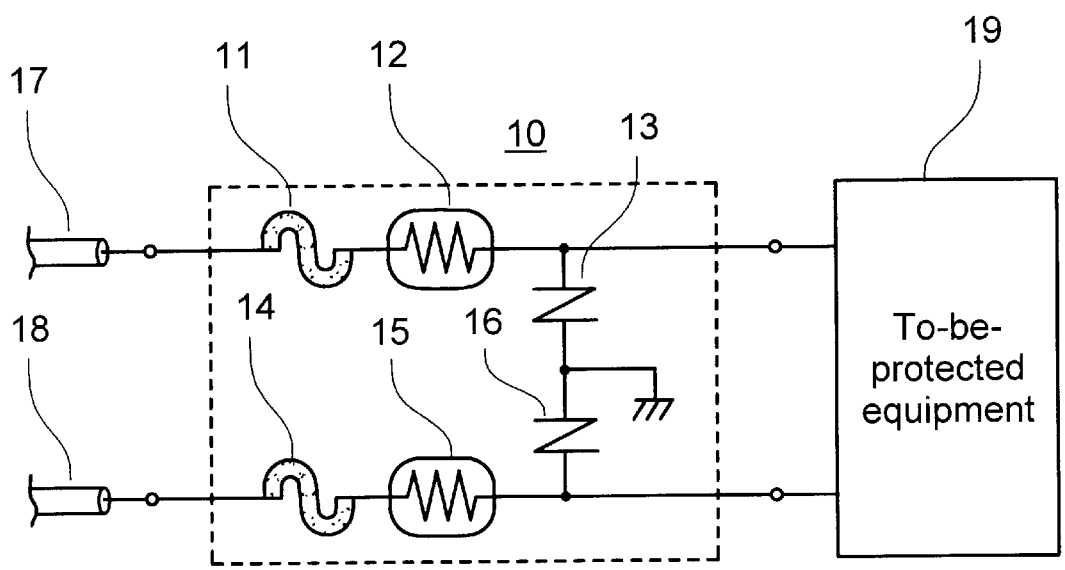
FIG. 5 shows one typical configuration of a prior art overcurrent protection circuit.

FIG. 2 shows an overcurrent protection circuit embodying the invention which makes use of the overcurrent protection thick-film resistor device 20 of FIG. 1. The difference between this overcurrent protection circuit 30 from the prior art shown in FIG. 5 is primarily that the overcurrent protection thick-film resistor device 20 shown in FIG. 1 is used in place of the overcurrent protection thick-film resistor device 11; accordingly, like elements are associated with like reference numerals or symbols and an explanation thereof is omitted herein.

In the overcurrent protection thick-film resistor device 20 and the overcurrent protection circuit 30 using the same, upon application of excessive current or overcurrent due to shorting between external cables and an associated power line (e.g., an AC 600 V line), the resulting current is forced to specifically concentrate on the width-reduced section 5 of the thick-film resistor 2. The current causes sparks at this section 5, which, in turn, causes the resistor line to be broken or open-circuited, thus preventing such overcurrent from flowing into the equipment 19 to be protected.

In this way, in the overcurrent protection thick-film resistor device 20, it becomes possible by providing the width-reduced section 5 at a single location of the thick-film resistor 2 to force the flow of resultant current upon application of overcurrent to concentrate only at the width-reduced section 5. This promotes the occurrence of any possible sparks thereat while simultaneously reducing or eliminating the occurrence of sparks at other sections of thick-film resistor 2. This, in turn, means that the location at which sparks are likely to occur is predetermined and predictable. The predictability of the spark location generally allows the designer to position peripheral components closer to the resistor device compared to the above-discussed prior art in which the location of the sparks is not predictable. Thus, the spatial efficiency of the circuit 30 is improved.

Furthermore, in the overcurrent protection thick-film resistor device 20, a spark occurring at concentration at a single portion of the width-reduced section 5 may be less in size than the aggregate of sparks occurring at a plurality of dispersed locations distributed along the entire thick-film resistor 2, as in the prior art. Accordingly, there is a reduced risk of spark discharge or arc due to sparks negatively affecting the remaining parts or components located near or around the overcurrent protection circuit 30.

Figure 3:
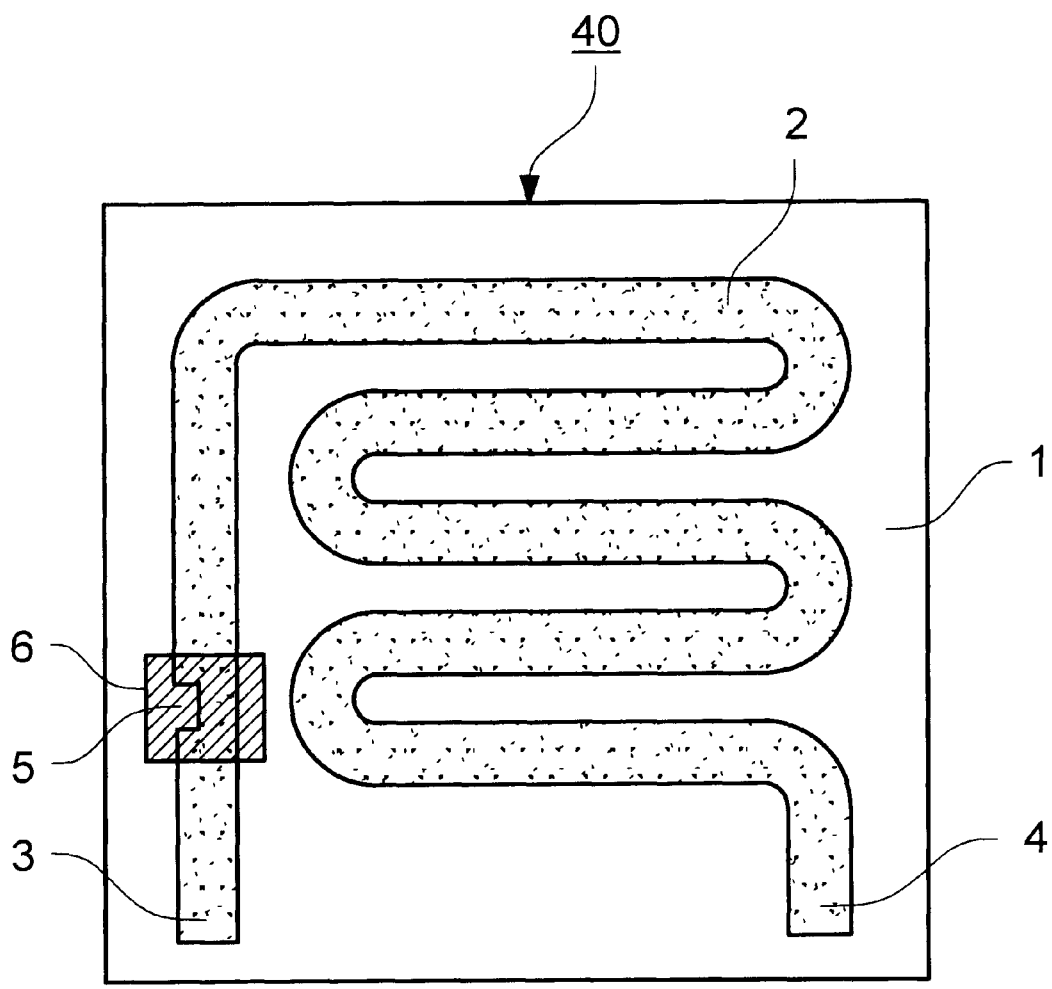
FIG. 3 shows an overcurrent protection thick-film resistor device in accordance with another exemplary embodiment of the invention.
Figure 6:
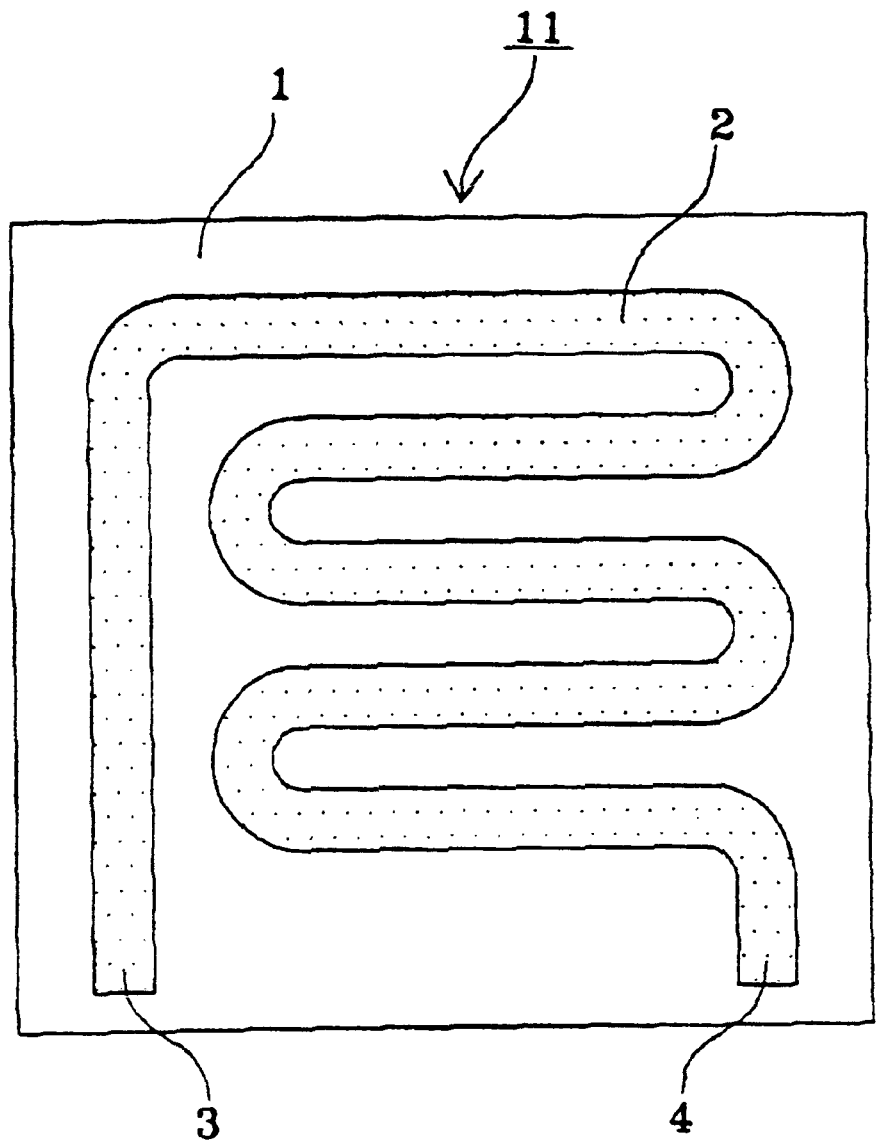
FIG. 6 shows one exemplary overcurrent protection thick-film resistor device in the prior art.

Turning now to FIG. 3, an overcurrent protection thick-film resistor device in accordance with another embodiment of the present invention is generally designated by numeral 40. In FIG. 3, certain parts or elements which are similar to those of the previous embodiment of FIG. 1 and the prior art of FIG. 6 are designated by similar reference characters, and an explanation thereof will is omitted. In FIG. 3, a casing 6 is provided, as a coating means for covering the width-reduced section 5. The coating means selectively coats the width-reduced section 5 at a single location of the overcurrent protection thick-film resistor device 40's thick-film resistor 2 which is formed into the meander shape. That is, the coating means only covers the width-reduced section 5, or alternatively covers the width-reduced section and a portion of the resistor to either side of the width-reduced section.

The overcurrent protection thick-film resistor device 40 thus configured as described above can be employed in the overcurrent protection circuit shown, for example, in FIG. 2. When overcurrent is applied due to electrical shorting between external cables and an associated power line (e.g., an AC 600 V line), the resulting current flow concentrates at the width-reduced section 5 of thick-film resistor 2, generating a spark or sparks which can break the resistor and thereby generate an electrical disconnection or open-circuit, thus eliminating excess or overcurrent to the to-be-protected equipment. Furthermore, by providing the casing 6 as the coating means with respect to the width-reduced section 5, any spark discharge or arc occurring due to such spark is interrupted or cut off. Since the spark is blocked from reaching other nearby components, these other components are not negatively affected by the sparks, unlike the prior art discussed above.

In this way, in the overcurrent protection thick-film resistor device 40, by coating or "wrapping" the width-reduced section 5 at a single location of the thick-film resistor 2, the risk of spark discharge negatively affecting other components located nearby the protection circuit employing the resistor device is reduced. At the same time, the selective casing allows for a reduction in the size of casing 6 as compared to the prior art in which the location of the spark cannot be predicted. This, in turn, reduces the cost associated with the attachment of the casing 6 to the resistor. Furthermore, since no arc due to a spark will travel beyond the outside of casing 6, it becomes possible to position other components closer to the casing 6, which, in turn, increases the use efficiency of the space around the overcurrent protection thick-film resistor device 40 and overcurrent protection circuitry employing the same.

In the foregoing embodiments, the casing 6 is used as the coating means for the width-reduced section 5. Other mechanisms can be used to cover the width-reduced section 5 for eliminating dispersion of spark discharge. For instance, similar advantages can be obtained with other approaches, including, but not limited to, painting non-combustible resin at the width-reduced section, dispensing a noncombustible sheet or seal at the width-reduced section, or the like.

In accordance with the overcurrent protection thick-film resistor device of the present invention, it becomes possible, by forming a width-reduced section at a single location of a thick-film resistor having either a meander or spiral shape, to render the portion of the resistor which is likely to generate a spark predictable. This is because that, upon application of overcurrent, the resulting current is forced to concentrate only at the width-reduced section, producing sparks which may result in an open-circuit thereat.

As a result, according to the overcurrent protection circuit of the present invention, the overall permitted distance between the spark-generating resistor and other peripheral components can be reduced (because the occurrence of the sparks can be better predicted and accounted for), thereby increasing the use efficiency of the space surrounding the overcurrent protection circuit. Further, the concentration of sparks at the single location of the thick-film resistor can enable the size of arc due to such spark or sparks to be less than that of arc components which are dispersed among a plurality of locations as in the prior art, thereby reducing or eliminating the negative affects caused by the sparks on other components disposed around the overcurrent protection circuit.

Furthermore, according to the overcurrent protection thick-film resistor device of the present invention, it is possible, by coating or "wrapping" only the width-reduced section of thick-film resistor by the coating means such as a casing, to eliminate occurrence of spark discharge or arc while simultaneously minimizing costs of the coating means as compared to the case where the thick-film resistor is coated in its entirety.

As a result, according to the overcurrent protection circuit of this invention, any other required components can be disposed near or around the overcurrent protection circuit, which further enhances the use efficiency of the space around the overcurrent protection circuit.

Those skilled in the art will appreciate that various modifications can be made to the above-described invention. Generally, according to the present invention, the location of sparks can be confined to a predictable location by using the width-reduced section. The dimensions of the width-reduced section can be varied to suit particular applications. Among other shapes, square-like, circular or triangular notches can be used to implement the width-reduced section.

Furthermore, the width-reduced section can be employed in many different types of resistors or other electrical components other than the specific meander-like or spiral resistors discussed above. Also, the thick-film resistors discussed above can be used to provide overcurrent protection in a wide variety of electrical equipment. The application of the resistors is not restricted to the specific embodiment disclosed in FIG. 2.

More generally, the above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A resistor device for overcurrent protection, said resistor device comprising:
   an insulating substrate;
   an elongated resistor disposed on a surface of said substrate; and
   a width-reduced section provided at one location of said resistor, wherein said width-reduced section has a greater propensity to generate sparks upon the application of overcurrent compared to remaining portions of said resistor;
   wherein said elongated resistor has either a meander-like shape or a spiral shape.

2. The resistor according to claim 1, wherein said resistor comprises a thick-film resistor.

3. The resistor according to claim 1, wherein said width-reduced section comprises a notch formed in one section of said resistor.

4. The resistor according to claim 1, further comprising a coating means covering said width-reduced section to inhibit sparks generated thereby.

5. The resistor according to claim 4, wherein said coating means comprises a casing.

6. The resistor according to claim 4, wherein said coating means comprises a layer of coating material applied to said width-reduced section.

7. A resistor device for overcurrent protection, said resistor device comprising:
   an insulating substrate;
   an elongated resistor disposed on a surface of said substrate; and
   a width-reduced section provided at one location of said resistor, wherein said width-reduced section has a greater propensity to generate sparks upon the application of overcurrent compared to remaining portions of said resistor
   a coating means covering said width-reduced section to inhibit sparks generated thereby, wherein said coating means selectively covers substantially only a region of said resistor including said width-reduced section.

8. An overcurrent protection circuit including:
   a resistor device for receiving overcurrent, said resistor device including:
   an insulating substrate;
   an elongated resistor disposed on a surface of said substrate; and
   a width-reduced section provided at one location of said thick-film resistor, wherein said width-reduced section has a greater propensity to generate sparks upon the application of overcurrent compared to remaining portions of said resistor;

wherein said elongated resistor has a meander-like shape or a spiral shape.

9. The overcurrent protection circuit according to claim 8, wherein said resistor comprises a thick-film resistor.

10. The overcurrent protection circuit according to claim 8, wherein said width-reduced section comprises a notch formed in one section of said resistor.

11. The overcurrent protection circuit according to claim 8, further comprising a thermistor and a varistor, wherein:

a first terminal of said resistor is connected to an external cable, and a second terminal of said resistor is connected to a first terminal of said thermistor;

a second terminal of said thermistor is connected to an electrical circuit to be protected, and also connected to a first terminal of said varistor; and a second terminal of said varistor is connected to ground.

12. The overcurrent protection circuit according to claim 11, further comprising at least one other resistor, thermistor and varistor, wherein:

a first terminal of said other resistor is connected to another external cable, and a second terminal of said other resistor is connected to a first terminal of said other thermistor;

a second terminal of said other thermistor is connected to said electrical circuit to be protected, and also connected to a first terminal of said other varistor; and a second terminal of said other varistor is connected to ground.

13. The overcurrent protection circuit according to claim 8, further comprising a coating means covering said width-reduced section to inhibit sparks generated thereby.

14. The overcurrent protection circuit according to claim 13, wherein said coating means comprises a casing.

15. The overcurrent protection circuit according to claim 13, wherein said coating means comprises a layer of coating material applied to said width-reduced section.

16. An overcurrent protection circuit comprising:

a resistor device for receiving overcurrent, said resistor device including:

an insulating substrate;

an elongated resistor disposed on a surface of said substrate; and a width-reduced section provided at one location of said thick-film resistor, wherein said width-reduced section has a greater propensity to generate sparks upon the application of overcurrent compared to remaining portions of said resistor;

further comprising a coating means covering said width-reduced section to inhibit sparks generated thereby, wherein said coating means selectively covers substantially only a region of said resistor including said width-reduced section.

* * * * *